(12) United States Patent
Kreiner et al.

(10) Patent No.: US 6,249,967 B1
(45) Date of Patent: Jun. 26, 2001

(54) FABRICATION OF A ROCKET ENGINE WITH A TRANSITION STRUCTURE BETWEEN THE COMBUSTION CHAMBER AND THE INJECTOR

(75) Inventors: Kurt B. Kreiner, Hawthorne; David Bronson, Manhattan Beach; Carl R. Stechman, Northridge; Peter E. Woll, Santa Clarita; Joel M. Neiderman, Agoura Hills, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/144,377

(22) Filed: Aug. 31, 1998

(Under 37 CFR 1.47)

Related U.S. Application Data

(60) Provisional application No. 60/057,368, filed on Aug. 29, 1997.

(51) Int. Cl.[7] ..................................................... B23P 15/00
(52) U.S. Cl. .......................................... 29/890.01; 29/428
(58) Field of Search .............................. 29/890.01, 428; 60/255, 256

(56) References Cited

U.S. PATENT DOCUMENTS

| 4,785,748 | 11/1988 | Sujata et al. . |
| 4,882,904 | 11/1989 | Schoenman . |
| 4,915,938 | 4/1990 | Sujata et al. . |
| 4,936,091 | 6/1990 | Schoenman . |
| 6,079,101 | * 6/2000 | Kreiner et al. ..................... 29/890.01 |
| 6,107,596 | * 8/2000 | Semenov et al. .................. 29/890.01 |

OTHER PUBLICATIONS

Jassowski, Donald M. et al., "Advanced Small Rocket Chambers Option 1–14 Lbf Ir–Re Rocket", NASA Contract 191014, Aug. 1992.

* cited by examiner

Primary Examiner—I Cuda Rosenbaum
(74) Attorney, Agent, or Firm—T. Gudmestad

(57) ABSTRACT

A rocket engine is fabricated by a multistep brazing and welding technique. An annular step collar is fns brazed to a trnnsition joint. This first subassembly is second brazed to the combustion chamber. This second subassembly is third brezed to an annular adaptor to form a third subassembly. The succeeding brazing steps are performed at successively lower temperatures. The third subassembly is welded to an injector.

13 Claims, 2 Drawing Sheets

FABRICATION OF A ROCKET ENGINE WITH A TRANSITION STRUCTURE BETWEEN THE COMBUSTION CHAMBER AND THE INJECTOR

This patent application is a regular application of provisional patent application Ser. No. 60/057,368, filed Aug. 29, 1997.

BACKGROUND OF THE INVENTION

This invention relates to he fabrication of a liquid-fueled rocket engine, and, more particularly, to the attachment of the injector to the combustion chamber.

A typical liquid-fueled rocket engine includes a generally cylindrical combustion chamber, with an injector attached to its injector end and a flared nozzle attached to its nozzle end A liquid propellant including fuel and an oxidizer flows through injector ports in the injector and into the combustion chamber. The propellant is mixed and ignited in the combustion chamber. The hot gas resulting from the combustion expands through the nozzle and drives the rocket eggine and the attached rocket structure in the direction opposite to that in which the nozzle is pointed.

In order to achieve maximum efficiency of the rocket engine in terms of thrust per weight of propellant and maximum specific impulse, the mixing (if any) of the propellant components must be complete to encourage complete combustion. An internal step structure at the injector end of the combustion chamber is under development to promote the complete mixing and combustion. The step structure also protects the injector end of the combustion chamber wall from the highest of the tp es developed inside of the combustion chamber.

The injector is normally welded or bolted to the injector end of the combustion chamber to achieve two main objectives, structural attachment and sealing against leakage of hot gas during engine firing. However, because of the high heating rates and thermal expansion mismatches associated with the rocket engine having a step strucre, welding and bolting have not proved feasible with this combination of different materials. A more complex attachment structure involving several different materials is required at the injector end.

Thus, while the rocket engine with internal step structure in the combustion chamber offers important potential benefits in terms of improved efficiency and specific impulse, those benefits have not been fully realized in initial forms of the rocket engine in part because of fabrication difficulties. There is a need for a fabrication approach which provides the necessary strength and sealing against hot gas leakage, and also allows the step design to function without damaging the combustion chamber. The present invention fulfills this need, and further provides related advantages.

SUMMARY OF THE INVENTION

The present invention provides a fabrication approach for a rocket engine having an internal step structure at the injector end. The fabrication approach allows the step structure to be present to improve performance, but provides the necessary indirect attachment so that the step structure does not damage the wall of the combustion chamber by expansion during firing. The attachment of the step structure to the injector and to the wall of the combustion chamber is selected to achieve sufficient structural strength and sealing against leakage of hot gas, and also to prevent damage to the combustion chamber wall. The resulting rocket engine has high efficiency and also good reliability.

In accordance with the invention, a method for fabricating a rocket engine comprises the steps of providing an annular step collar having an outer diameter, providing an annular transition joint, and first brazing, at a first-brazing temperature, the step collar to the transition joint to form a first subassembly. The method further includes providing a combustion chamber, and second brazing, at a second-brazing temperature, the transition joint of the first subassembly to the combustion chamber to form a second subassembly. An annular adaptor is provided and third brazed, at a third brazing temperature, to the step collar of the second subassembly to form a third subassembly. An injector is provided and welded to the annular adaptor of the third subassembly.

The injector, step collar, and combustion chamber must be joined together at the injector end of the combustion chamber by the attachment which provides sufficient strength, seals agalnst the leakage of hot combustion gas from the interior of the combustion chamber, and prevents damage due to the large dimensional changes experienced during the firing of the rocket engine. In the preferred approach of the present invention as described herein, the attachment includes a step collar/injector joint structure joining the step collar and the injector, and a clip structure joining the combustion chamber and the step collar. The clip structure comprises a C-shaped annular clip having a first leg extending parallel to the chamber length and with an inner diameter of about that of the outer diameter of the combustion chamber and affixed thereto, a second leg extending parallel to the chamber length and with an outer diameter of no greater than that of the outer diameter of the step collar and affixed thereto, and a web extending between the first leg and the second leg. This C-clip provides the necessary strength by acting in the manner of a circumferential rib to withstand hoop stresses produced during the manufacturing and the firing of the rocket engine and also the thermal expansion stresses. It seals the injector end, and also allows the step collar to differentially expand without loading excessive additional stress into the wall of the combustion chamber. The clip is preferably made from a gold-plated molybdenum alloy, most preferably an alloy of 50 weight percent molybdenum, 50 weight percent rhenium.

The present invention thus provides a rocket engine which has improved efficiency of operation and improved specific impulse due to the presence of the internal step within the combustion chamber. It also has good reliability because its structure withands the combustion temperatures to which it is exposed, and accounts for additional stresses caused by the presence of the step collar. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRITON OF THE INVENTION

Figure 1:
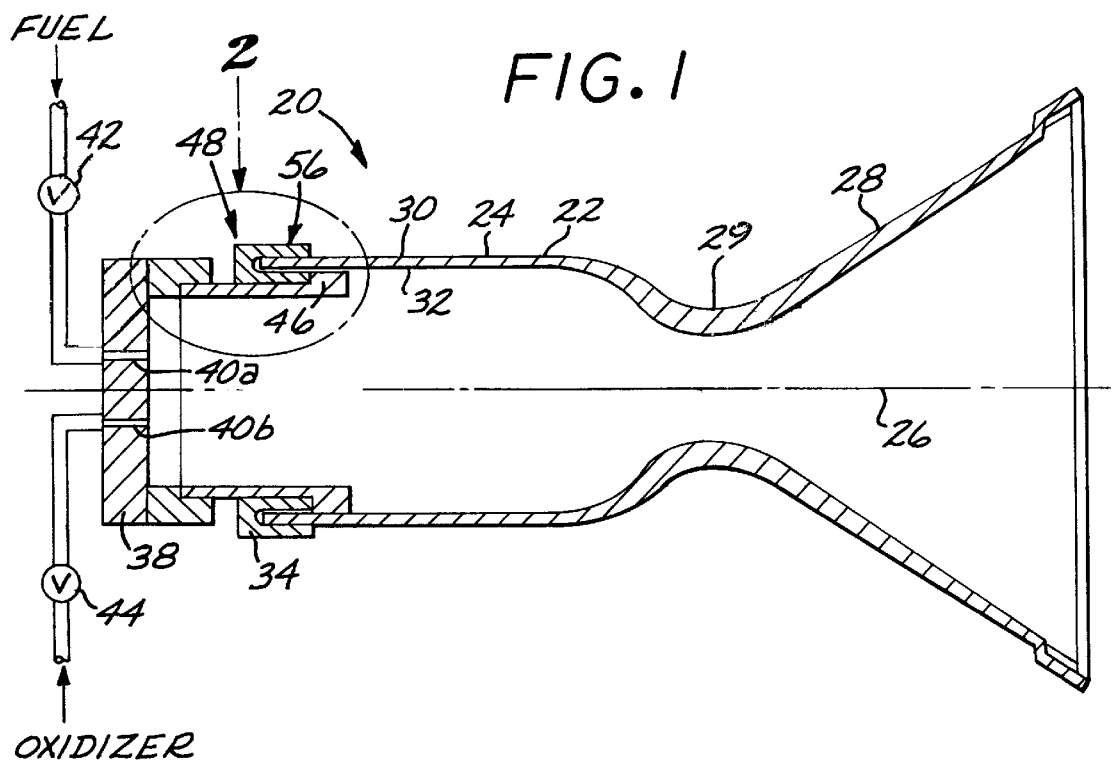
FIG. 1 is a sectional view of a rocket engine.
Figure 2:
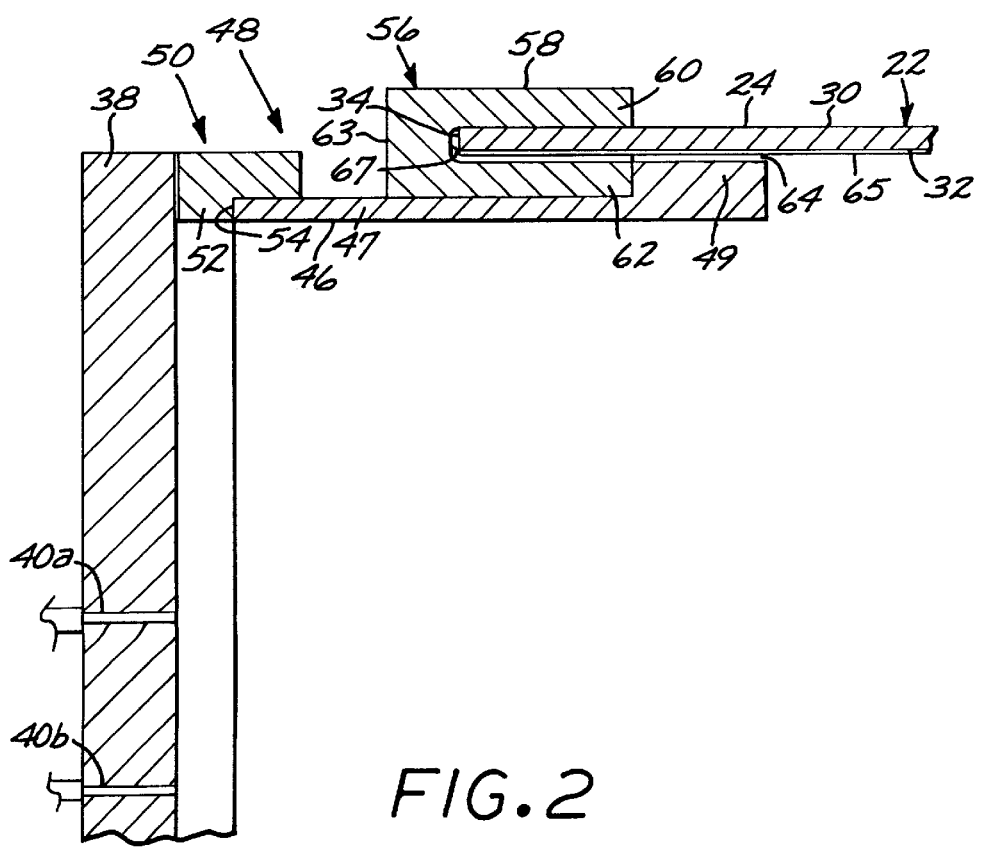
FIG. 2 is an enlarged detail of FIG. 1 in region 2—2, showing the injector and injector end of the combustion chamber.

FIG. 1 depicts a rocket engine 20, and FIG. 2 shows a detail of the rocket engine. The rocket engine 20 includes a combustion chamber 22 having two major parts, a generally cylindrical annular wall 24 having a cylindrical axis 26, and an expansion nozzle 28. A narrowed throat 29 separates the cylindrical wall portion 24 from the expansion nozzle 28. In the illustrated rocket engine 20, the wall 24, the throat 29, and the nozzle 28 are fabricated separately and joined together, but they may instead be fabricated integrally as a single unit. The cylindrical wall 24 has an outer cylindrical surface 30 and an inner cylindrical surface 32. The combustion chamber 22 has an injector end 34 and a nozzle end 36.

An injector 38 is attached to the injector end 34 of the combustion chamber 22. The injector 38 may be of any operable design, but is typically a plate having a plurality of injector ports 40 therein, of which only two are shown in FIG. 1. The propellant is provided to the combustion chamber 22 through the injector ports 40. Some of injector ports 40a are supplied with a fuel through a fuel valve 42, and others of the injector ports 40b are supplied with an oxidizer through an oxidizer valve 44. The fuel and oxidizer flow through their respective injector ports 40 into the interior of the combustion chamber 22 and mix together. Where the mixture is hypergolic, as in the case of the preferred monomethylhydrazine (fuel) and nitrogen tetroxide/3 percent nitric oxide (oxidizer), the mixture ignites spontaneously. In other cases involving propellants where the mixture does not spontaneously ignite, an ignitor (not shown) is provided. The gaseous combustion products of the combustion expand rearwardly and outwardly through the nozzle 28 and drive the rocket engine 20, and the spacecraft to which it is attached, in the opposite direction.

To aid in the thorough mixdng and combustion of the propellant fuel and oxidizer, a generally cylindrical annular step collar 46 is fitted within the combustion chamber 22 at and adjacent to the injector end 34 thereof. When viewed in circumferential section as in FIG. 2, the step collar 46 has a generally "L" shape, with a long leg 47 of the "L" lying parallel to the cylindrical axis 26 and a short leg 49 of the "L" lying perpendicular to the cylindrical axis 26.

An attachment 48 joins the combustion chamber 22, the step collar 46, and the injector 38. The attachment includes several elements and several joints. The attachment must mechanically join the combustion chamber 22, the step collar 46, and the injector 38 to bear the loads imposed during handling and service, despite large temperature changes and gradients exeenced during service, and must also provide a seal against the leakage of hot gas at the injector end 34 of the combustion chamber 22. A step collar/injector joint structure 50 joins the injector 38 to the step collar 46. In this preferred form, the step collar/injector joint structure includes a cylindrical annular adaptor 52 joined to an end 54 of the step collar 46 remote from the combustion chamber 22. The adaptor 52 is also joined to the periphery of the injector 38, so that it does not overlie any of the injector ports 40.

A transition joint clip structure 56 including a cylindrical annular clip 58 joins the wall 24 of the combustion chamber 22 to the step collar 46. The clip 58 includes a first leg 60 lying radially outwardly from the wall 24 and extending parallel to the axis 26. The first leg 60 has an inner cylindrical diameter which is very slightly larger, typically by about 0.005–0.006 inches, than the outer diameter of the wall 24, so that the first leg 60 may slip over in facing relation to, and be affixed to, the outer cylindrical surface 30. The clip 58 includes a second leg 62 lying radially inwardly from the wall 24 and extending parallel to the axis 26. The second leg 62 has an outer cylindrical diameter which is smaller, typically by about 0.020–0.024 inches, than the inner diameter of the wall 24. A web 63 joins the first leg 60 to the second leg 62.

The step collar 46 is preferably not joined directly to the wall 24 because in such a structure the outward thermal expansion of the step collar 46 during service deforms the wall 24 and can lead to its failure. Instead, the clip 58 serves to bear part of the stress and can also absorb thermal expansion and mechanical strains in the manner of a spring by the bending of the legs 60 and 62.

The dimensions of the wall 24, the step collar 46, and the clip 58 are selected such that there is a gap 64 of operable width between the second leg 62 of the clip 58 and the step collar 46, on the one hand, and the inner cylindrical surface 32 of the wall 24. If the gap is too small, the step collar 46 may expand during service into contact with the inner cylindrical surface 32 of the wall 24 and deform or crack it. If the gap is too large, heated combustion gas may backflow into the gap 64 and damage the wall 24. For a typical engine wherein the cylindrical diameter of the inner cylindrical surface 32 is about 1.78 inches and the engine is made of the preferred materials of construction discussed subsequently, the size of the gap 64 is preferably from about 0.010 inches to about 0.012 inches, the measurements being made at room temperature. (Stated equivalently, the difference in the outer diameter of the step collar 46 and second leg 62, on the one hand, and the inner diameter of the surface 32 of the wall 24, on the other, is from about 0.020 inches to about 0.024 inches.) Differently sized gaps may be appropriate for other materials and dimensions.

The step collar 46 is directly exposed to some of the most severely corrosive and erosive environments found within the combustion chamber 22. It is therefore made of a material having a greater corrosion and erosion resistance than the wall 24 of the combustion chamber 22. The step collar 46 is preferably made of a material having a high melting point and good corrosion/erosion resistance in the combustion environment of the combustion chamber 22, such as an alloy of platinum and rhodium, an alloy of columbium, or a ceramic. The preferred alloy of platinum and rhodium is 90 percent by weight platinum, balance rhodium. The preferred alloy of columbium is 10 percent by weight hafnium, 1 percent by weight titanium, balance columbium. The preferred ceramic is aluminum oxide, thorium oxide, or yttria-stabilized zirconium oxide.

Figure 3:
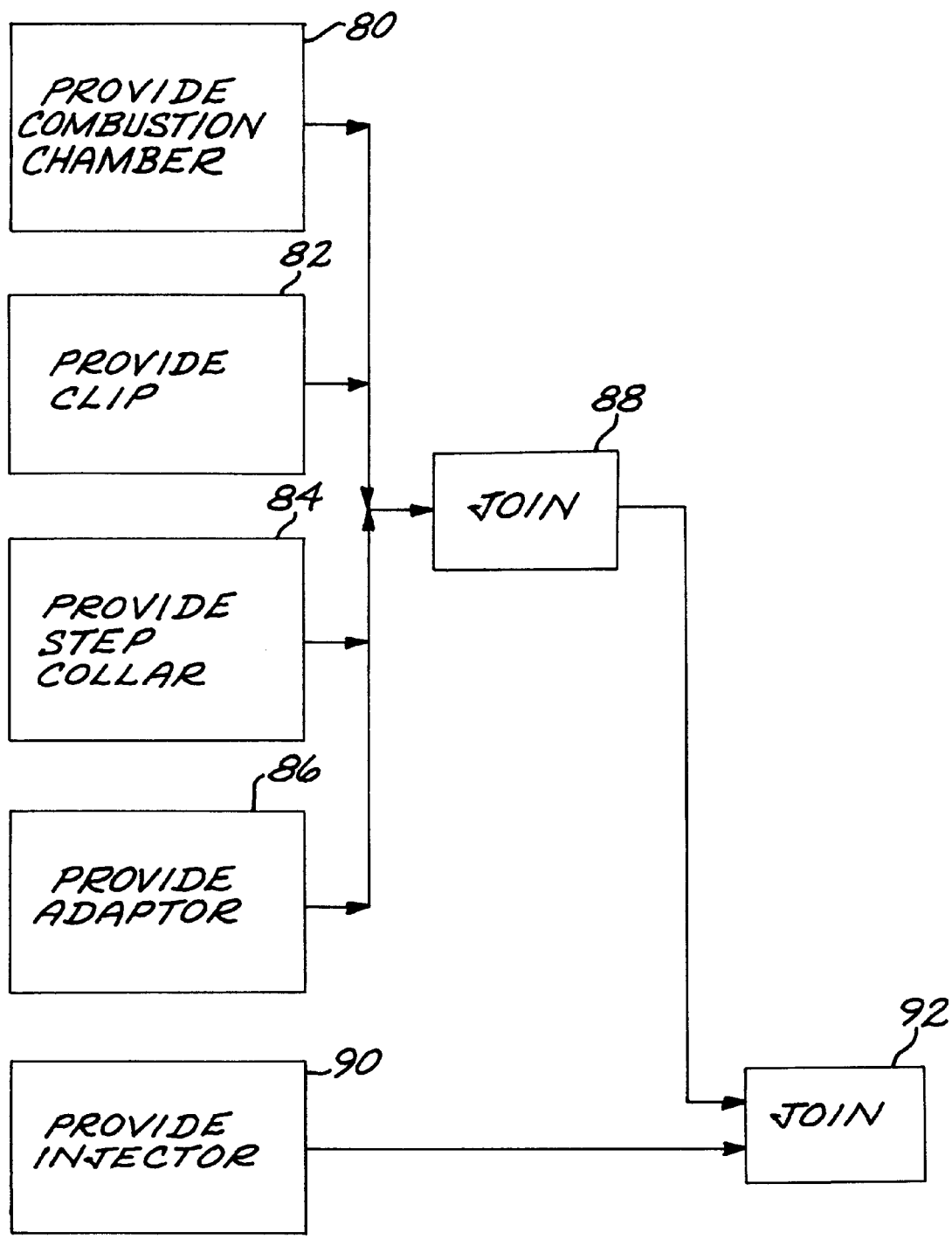
FIG. 3 is a block flow diagram of a method for fabricating the rocket engine.

FIG. 3 depicts a preferred approach for fabricating the rocket engine 20. In the following discussion, preferred materials, nominal dimensions, and joining techniques used in the fabrication of the rocket engine of most interest to the inventors are described, but the invention is not limited to these disclosed items unless otherwise indicated. The combustion chamber 22 is provided, numeral 80. The combustion chamber may be made of any operable material, but is preferably made of rhenium having a comiog of iridium 65, about 0.003–0.005 inches thick, on the inner cylindrical surface 32 to protect the rhenium from damage during service. The combustion chamber may be of any operable size and specific configuration. For a prefered application of interest to the inventors, the nominal overall length of the combustion chamber 22 is about 3.7 inches, the nominal diameter of the inner cylindrical surface 32 is about 1.780 inches, and the nominal diameter of the outer cylindrical surface 30 is about 1.910 inches (so that the wall thickness of the wall 24 is about 0.065 inches).

The clip 58 is provided, numeral 82. The clip 58 may be made of any operable material, but is preferably made of molybdenum or an alloy of 50 weight percent molybdenum, 50 percent by weight rhenium, which is plated with a thin gold plating. The clip may also be made of columbium. This material has a strength that is several times greater than that of the rhenium material of the combustion chamber 22. With this greater strength, the clip 58 serves in the manner of a circumferential rib to carry the load produced by the differential thermal expansion of the step collar 46 during service, ensuring that minimal load is transferred to the wall 24 of the combustion chamber 22 as the step collar 46 expands upon heating in service. In the preferred embodiment, pertinent nominal dimensions of the clip 58 are initial inner diameter of the first leg 60 of 1.901 inches, outer diameter of the second leg 62 of 1.738 inches, and inner diameter of the second leg 62 of 1.571 inches. (The inner diameter of the firtt leg 60 is subsequently match machined to the outer diameter of the combustion chamber, so that there is a spacing of no more than about 0.005–0.006 between them.)

The step collar 46 is provided, numeral 84. The step collar 46 may be made of any operable maerial having sufficient oxidation and erosion resistance, but is preferably made of a refractory material such as an alloy of platinum and rhodium, or an alloy of columbium. The preferred alloy of platinum and rhodium is 90 percent by weight platinum, balance rhodium. The preferred alloy of columbium is 10 percent by weight hafnium, 1 percent by weight titanium, balance columbium. In the preferred embodiment, the pertinent nominal dimension is the outer diameter of the second leg of 1.740 inches.

The step collar 46 and the clip 58 are firt brazed together, numeral 86, with the inner diameter of the second leg 62 brazed to the step collar 46 as shown in FIG. 2. The preferred braze alloy is an alloy of about 60 weight percent palladium and about 40 weight percent nickel, having a solidus/ liquidus eutectic temperature of about 1238° C. To accomplish the first brazing, a shim about 0.002–0.005 inches thick of the braze alloy is placed between the faces to be joined, and additional brazing alloy is supplied as a wire wrapped around the end of the joint to be wicked into the joint. The assembly, supported by appropriate tooling, is heated in a vacuum of about 9×10$^{-5}$ torr or less, at a heating rate of 830° C. per hour, to a temperature of about 1093° C. and held for about 15–20 minutes. It is then further heated to a temperature of about 1260° C. and held for about 8–10 minutes. It is then cooled to below about 982° C. in vacuum, and further cooled to room temperature in argon. The result is a first subassembly.

The first subassembly is second brazed to the combustion chamber, numeral 88, with the inner diameter of the first leg 60 brazed to the outer cylindrical surface 30. The preferred braze alloy is an alloy of about 82 weight percent gold and about 18 weight percent nickel, having a solidus/liquidus eutectic temperature of about 949° C., below that of the brazing alloy used in the first brazing 86. To accomplish the second brazing, a shim about 0.002–0.005 inches thick of the braze alloy is placed between the faces to be joined, and additional brazing alloy is supplied as a wire wrapped around the end of the joint to be wicked into the joint. The assembly, supported by appropriate tooling, is heated in a vacuum of about 9×10$^{-5}$ torr or less, at a heating rate of 830° C. per hour, to a temperature of about 899° C. and held for about 15–20 minutes. It is then further heated to a temperature of about 991° C. and held for about 8–10 minutes. It is then cooled to below about 232° C. in vacuum, and further cooled to room temperature in argon. The result is a second subassembly.

In assembling and joining the combustion chamber 22, the clip 58, and the step collar 46, care is taken so that there is no contact between any gold plating on the clip 58 and the iridium coating 65 of the combustion chamber. Experience has shown that an interdiffusion of iridium and gold at elevated temperature may lead to a breach in the protective iridium coating, allowing a reaction of the combustion products with the underlying metallic substrate. The gap 64 ensures that there is no contact between the gold coating on the second leg 62 of the clip 58 and the iridium coating 65. The gold coating on the clip 58 is preferably machined away from a trough region 67 on the inside curvature of the web 63, to ensure that there can be no contact between gold in that region and the iridium coating 65.

The annular adaptor 52 is provided, numeral 90. The adaptor is preferably made of a titanium alloy such as an alloy of 6 weight percent aluminum, 4 weight percent vanadium, balance titanium.

The adaptor 52 is third brazed to the remote end 54 of the step collar 46 of the second subassembly, numeral 92. The preferred braze alloy is an alloy of about 82 weight percent silver, about 9 weight percent palladium, and about 9 weight percent gallium, having a solidus temperature of about 845° C. and a liquidus temperature of about 880° C., below that of the brazing alloy used in the second brazing 88. To accomplish the brazing, a shim about 0.002–0.005 inches thick of the braze alloy is placed between the faces to be joined, and additional brazing alloy is supplied as a wire wrapped around the end of the joint to be wicked into the joint. The assembly, supported by appropriate tooling, is heated in a vacuum of about 9×10$^{-5}$ torr or less, at a heating rate of 830° C. per hour, to a temperature of about 812° C. and held for about 15–20 minutes. It is then further heated to a temperature of about 904° C. and held for about 6–8 minutes. It is then cooled to below about 232° C. in vacuum, and further cooled to room temperature in argon. The result is a third subassembly.

The injector plate 38 is provided, numeral 94. The injector plate 38 is typically made of titanium-6 weight percent aluminum-4 weight percent vanadium. The injector plate 38 is joined to the adaptor 52 of the third subassembly, numeral 96, preferably by electron beam welding.

A rocket engine made according to the preferred approach has been conctucted and tested. The rocket engine had a measured specific impulse of 324 seconds, as compared with a measured specific impulse of 315 seconds for a rocket engine that is otherwise similar but lacks the internal step collar and does not use the present fabrication approach.

Although a particular embodiinent of the invention has been described in detail for purposes of illustration, various modifications and enhancements may be made without departing from the spirit and scope of the invention. Accordingly, the invention is not to be limited except as by the appended claims.

What is claimed is:

1. A method for fabricating a rocket engine, comprising the steps of:

providing an annular step collar having an outer diameter;

providing an annular clip structure, the clip structure comprising a C-shaped annular clip having a first leg, a second leg parallel to the first leg, and a web extending between the fist leg and the second leg;

first brazing the step collar to the second leg of the clip to form a first subassembly;

providing a combustion chamber;

second brazing the first leg of the clip of the first subassembly to the combustion chamber to form a second subassembly;

providing an annular adaptor, third brazing the step collar of the second subassembly to the adaptor to form a third subassembly;

providing an injector; and welding the adaptor of the third subassembly to the injector.

2. The method of claim 1, wherein the step of providing an annular step collar includes the step of providing the step collar made of a material selected from the group consisting of an alloy of platinum and rhodium, an alloy of columbium, and a ceramic.

3. The method of claim 1, wherein the step of providing a combustion chamber includes the step of providing the combustion chamber having a wall comprising, at least in part, rhenium.

4. The method of claim 1, wherein the step of providing a clip structure includes the step of providing the clip comprising, at least in part, a metal selected from the group consisting of molybdenum and columbium.

5. The method of claim 1, wherein the step of providing an annular adaptor includes the step of providing the adaptor comprising, at least in part, an alloy of titanium-6 weight percent aluminum-4 weight percent vanadium.

6. The method of claim 1, wherein the step of providing an injector includes the step of providing the injector comprising, at least in part, a titanium alloy.

7. The method of claim 1, wherein the step of first brazing includes a step of providing a first brazing alloy comprising an alloy of about 60 weight percent palladium and about 40 weight percent nickel.

8. The method of claim 1, wherein the step of second brazing includes a step of providing a second brazing alloy comprising an alloy of about 82 weight percent gold and about 18 weight percent nickel.

9. The method of claim 1, wherein the step of third brazing includes a step of providing a third brazing alloy comprising an alloy of about 82 weight percent silver, about 9 weight percent palladium, and about 9 weight percent gallium.

10. The method of claim 1, wherein the step of welding the adaptor includes the step of electron beam welding the adaptor to the injector.

11. A method for fabricating a rocket engine, comprising the steps of:

providing an annular step collar having an outer diameter;

providing an annular transition joint;

first brazing, at a first-brazing temperature, the step collar to the transition joint to form a first subassembly;

providing a combustion chamber;

second brazing, at a second-brazing temperature, the transition joint of the first subassembly to the combustion chamber to form a second subassembly;

providing an annular adaptor;

third brazing, at a third brazing temperature, the step collar of the second subassembly to the adaptor to form a third subassembly;

providing an injector, and welding the adaptor of the third subassembly to the injector.

12. The method of claim 11, wherein the first brazing temperature is greater than the second brazing temperature, and the second brazing temperature is greater than the third brazing temperature.

13. The method of claim 11, wherein the step of providing an annular transition joint includes the step of providing an annular clip structure, the clip structure comprising a C-shaped annular clip having a first leg, a second leg parallel to the first leg, and a web extending between the first leg and the second leg.

* * * * *